United States Patent
Hao et al.

(10) Patent No.: US 9,348,881 B1
(45) Date of Patent: May 24, 2016

(54) VISUAL CONTENT QUERY FOR MULTI-DIMENSIONAL DATASETS

(75) Inventors: Ming C. Hao, Palo Alto, CA (US); Umeshwar Dayal, Saratoga, CA (US); Nimesh Patel, North Brunswick, NJ (US); David V. Dodd, Alpharetta, GA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1413 days.

(21) Appl. No.: 11/647,715

(22) Filed: Dec. 29, 2006

(51) Int. Cl.
| G06T 11/20 | (2006.01) |
| G06F 17/30 | (2006.01) |
| G06F 3/048 | (2013.01) |
| G06F 11/30 | (2006.01) |
| G06Q 10/10 | (2012.01) |
| G06F 9/44 | (2006.01) |
| G09G 5/22 | (2006.01) |
| G06F 3/0481 | (2013.01) |

(52) U.S. Cl.
CPC .... *G06F 17/30572* (2013.01); *G06F 17/30958* (2013.01); *G06F 3/0481* (2013.01); *G06F 9/4443* (2013.01); *G06F 17/30* (2013.01); *G06F 17/30551* (2013.01); *G06F 17/30554* (2013.01); *G06F 17/30716* (2013.01); *G06F 17/30994* (2013.01); *G06Q 10/10* (2013.01); *G06T 11/20* (2013.01); *G06T 11/206* (2013.01); *G09G 5/22* (2013.01)

(58) Field of Classification Search
CPC ........ G06T 11/20; G06T 11/206; G09G 5/22; G06F 17/30572; G06F 17/30958; G06F 17/30; G06F 17/30551; G06F 17/30554; G06F 17/30716; G06F 17/30994; G06F 3/0481; G06Q 10/1093

USPC .......................................................... 345/440
See application file for complete search history.

(56) References Cited

U.S. PATENT DOCUMENTS

| 3,487,308 A | 12/1969 | Johnson |
| 5,581,797 A | 12/1996 | Baker et al. |
| 5,588,117 A | 12/1996 | Karp et al. |
| 5,608,904 A | 3/1997 | Chaudhuri et al. |
| 5,623,590 A | 4/1997 | Becker et al. |
| 5,623,598 A | 4/1997 | Voigt et al. |
| 5,634,133 A | 5/1997 | Kelley |
| 5,659,768 A | 8/1997 | Forbes et al. |
| 5,694,591 A | 12/1997 | Du et al. |

(Continued)

FOREIGN PATENT DOCUMENTS

EP 0778001 11/1996

OTHER PUBLICATIONS

D. Keim, M.C. Hao; U. Dayal; "Hierarchical pixel bar charts", IEEE Trans. on Visualization and Computer Graphics, vol. 8, No. 3, Jul.-Sep. 2002, pp. 255-269.*

(Continued)

*Primary Examiner* — Jin-Cheng Wang
(74) *Attorney, Agent, or Firm* — Trop, Pruner & Hu, P.C.

(57) ABSTRACT

A method, apparatus, and system are disclosed for providing content queries for multi-dimensional datasets. One embodiment is a method for software execution that displays, on an interactive graph, categories and values of a multi-dimensional dataset. A content query is issued from a user for a value from at least one of the categories. Interactive graphs are generated that are responsive to the content query.

19 Claims, 7 Drawing Sheets

(56) References Cited

U.S. PATENT DOCUMENTS

| | | |
|---|---|---|
| 5,742,778 A | 4/1998 | Hao et al. |
| 5,757,356 A | 5/1998 | Takeasaki et al. |
| 5,801,688 A | 9/1998 | Mead et al. |
| 5,828,866 A | 10/1998 | Hao et al. |
| 5,844,553 A | 12/1998 | Hao et al. |
| 5,878,206 A | 3/1999 | Chen et al. |
| 5,903,891 A | 5/1999 | Chen et al. |
| 5,924,103 A | 7/1999 | Ahmed et al. |
| 5,929,863 A | 7/1999 | Tabei et al. |
| 5,940,839 A | 8/1999 | Chen et al. |
| 5,986,673 A | 11/1999 | Martz |
| 5,999,193 A | 12/1999 | Conley, Jr. et al. |
| 6,052,890 A | 4/2000 | Malagrino, Jr. et al. |
| 6,097,399 A | 8/2000 | Bhatt |
| 6,115,027 A | 9/2000 | Hao et al. |
| 6,144,379 A | 11/2000 | Bertram et al. |
| 6,211,880 B1 | 4/2001 | Impink, Jr. |
| 6,211,887 B1 | 4/2001 | Meier et al. |
| 6,269,325 B1 | 7/2001 | Lee et al. |
| 6,314,453 B1 | 11/2001 | Hao et al. |
| 6,377,287 B1 | 4/2002 | Hao et al. |
| 6,400,366 B1 | 6/2002 | Davies et al. |
| 6,429,868 B1 | 8/2002 | Dehner, Jr. et al. |
| 6,466,946 B1 | 10/2002 | Mishra et al. |
| 6,502,091 B1 | 12/2002 | Chundi et al. |
| 6,581,068 B1 * | 6/2003 | Bensoussan ...... G06F 17/30457 |
| 6,584,433 B1 | 6/2003 | Zhang et al. |
| 6,590,577 B1 | 7/2003 | Yonts |
| 6,603,477 B1 | 8/2003 | Tittle |
| 6,658,358 B2 | 12/2003 | Hao et al. |
| 6,684,206 B2 | 1/2004 | Chen et al. |
| 6,727,926 B1 | 4/2004 | Utsuki et al. |
| 6,934,578 B2 | 8/2005 | Ramseth |
| 7,020,869 B2 | 3/2006 | Abrari et al. |
| 7,202,868 B2 | 4/2007 | Hao |
| 7,218,325 B1 | 5/2007 | Buck |
| 7,221,474 B2 | 5/2007 | Hao et al. |
| 7,313,533 B2 | 12/2007 | Chang et al. |
| 7,567,250 B2 | 7/2009 | Hao et al. |
| 7,714,876 B1 | 5/2010 | Hao |
| 2002/0118193 A1 | 8/2002 | Halstead, Jr. |
| 2002/0171646 A1 | 11/2002 | Kandogan |
| 2003/0065546 A1 | 4/2003 | Goruer et al. |
| 2003/0071815 A1 | 4/2003 | Hao et al. |
| 2003/0187716 A1 * | 10/2003 | Lee .................. 705/10 |
| 2003/0221005 A1 | 11/2003 | Betge-Brezetz et al. |
| 2004/0051721 A1 | 3/2004 | Ramseth |
| 2004/0054294 A1 | 3/2004 | Ramseth |
| 2004/0054295 A1 | 3/2004 | Ramseth |
| 2004/0168115 A1 | 8/2004 | Bauernschmidt |
| 2004/0205450 A1 * | 10/2004 | Hao et al. .................. 715/500 |
| 2004/0210540 A1 | 10/2004 | Israel et al. |
| 2004/0252128 A1 * | 12/2004 | Hao et al. .................. 345/581 |
| 2005/0038784 A1 * | 2/2005 | Zait .................. G06F 17/30312 |
| 2005/0066026 A1 | 3/2005 | Chen et al. |
| 2005/0088441 A1 * | 4/2005 | Hao et al. .................. 345/440 |
| 2005/0119932 A1 | 6/2005 | Hao |
| 2005/0177598 A1 * | 8/2005 | Hao et al. .................. 707/104.1 |
| 2005/0219262 A1 | 10/2005 | Hao et al. |
| 2006/0095858 A1 | 5/2006 | Hao et al. |
| 2006/0116989 A1 * | 6/2006 | Bellamkonda .... G06F 17/30489 |
| 2007/0203902 A1 * | 8/2007 | Bauerle et al. .................. 707/5 |
| 2007/0225986 A1 | 9/2007 | Bowe, Jr. et al. |
| 2008/0180382 A1 | 7/2008 | Hao |
| 2009/0033664 A1 | 2/2009 | Hao et al. |

OTHER PUBLICATIONS

D.A. Keim, M. Hao, U. Dayal, and M. Hsu, "Pixel Bar Charts: A Visualization Technique for Very Large Multi-Attribute Data Sets," Information Visualization J., vol. 1, No. 1, Mar. 2002, pp. 20-34.*

Deun et al., Multidimensional Scaling, Open and Distance Learning, Jan. 12, 2000 (pp. 1-16).

http://www.pavis.org/essay/multidimensional_scaling.html, 2001 Wojciech Basalaj, (pp. 1-30).

D. Keim et al Pixel Bar Charts: A New Technique for Visualization Large Multi-Attribute Data Sets with Aggregation:, HP Technical Report, Apr. 2001, pp. 1-10.

M. Ankerst et al "Towards an effective cooperation of the computer and the computer user for classification, Proc. 6th Int. Conf. on Knowledge Discovery and Data Mining ," (KDD'2000), Aug. 20-23, 2000, Boston, MA, 2000, pp. 1-10.

M.C. Hao et al "Visual Mining of E-customer Behavior Using Pixel Bar Charts,", HP Technical Report, Jun. 20, 2001, pp. 1-7.

B. Shneiderman, "Tree Visualization with Treemaps: a 2-D Space-Filling Approach", pp. 1-10, Jun. 1991.

Daniel Keim et al "Designing Pixel-Orientated Visualization Techniques: Theory and Applications" IEEE Transactions on Visualization and Computer Graphics, vol. 6, No. 1, Jan.-Mar. 2000, pp. 59-78.

\* cited by examiner

| | A | B | C | D | E | F | G | H | I | J | K | L | M | N |
|---|---|---|---|---|---|---|---|---|---|---|---|---|---|---|
| 1 | Business | Cost | Duration | Employee | CardNumb | UnitName | ToNumber | CallType | FromLocat | FromState | FromCount | ToLocation | ToState | ToCountry |
| 2 | Technolog | 0.07 | 2 | 791 | 5.03E+09 | Domestic | 9.16E+09 | Direct Dist | HONOLUL | Hawaii | USA | FAIR OAK | California | USA |
| 3 | Technolog | 1.18 | 28 | 791 | 5.03E+09 | Domestic | 4.08E+09 | Direct Dist | ROSEVILL | California | USA | SAN JOSE | California | USA |
| 4 | Technolog | 0.04 | 1 | 1197 | 8.58E+09 | Domestic | 6.31E+09 | Direct Dist | AUBURN | California | USA | NAPERVIL | Illinois | USA |
| 5 | Imaging & | 0.08 | 2 | 1203 | 8.36E+09 | Domestic | 5.25E+09 | Direct Dist | CANOGAP | California | USA | | California | USA |
| 6 | Imaging & | 0.13 | 3 | 1203 | 8.36E+09 | Domestic | 9.17E+09 | Direct Dist | OCEANSID | California | USA | FOLSOM | California | USA |
| 7 | Imaging & | 0.97 | 23 | 1203 | 8.36E+09 | Domestic | 5.25E+09 | Direct Dist | OCEANSID | California | USA | | California | USA |
| 8 | Imaging & | 0.04 | 1 | 1203 | 8.36E+09 | Domestic | 9.05E+09 | Direct Dist | OCEANSID | California | USA | JACKSON | Florida | USA |
| 9 | Imaging & | 0.04 | 1 | 1203 | 8.36E+09 | Domestic | 9.05E+09 | Direct Dist | OCEANSID | California | USA | JACKSON | Florida | USA |
| 10 | Imaging & | 0.07 | 2 | 1203 | 8.36E+09 | Domestic | 5.61E+09 | Direct Dist | OCEANSID | California | USA | DELRAY B | Florida | USA |
| 11 | Imaging & | 0.44 | 12 | 1203 | 8.36E+09 | Domestic | 5.25E+09 | Direct Dist | QUEENS | New York | USA | | California | USA |
| 12 | Imaging & | 0.26 | 7 | 1203 | 8.36E+09 | Domestic | 5.25E+09 | Direct Dist | QUEENS | New York | USA | | California | USA |
| 26479 | Imaging & | 4.24 | 7 | 81352 | 8.44E+09 | Internation | 3.61E+09 | Direct Distance Dialing | | | Thailand | ORCHARD | Washingto | USA |
| 26480 | Imaging & | 1.89 | 51 | 81352 | 8.44E+09 | Domestic | 3.61E+09 | Direct Dist | OCEANSID | California | USA | ORCHARD | Washingto | USA |
| 26481 | Imaging & | 0.7 | 19 | 81352 | 8.44E+09 | Domestic | 3.61E+09 | Direct Dist | OCEANSID | California | USA | CAMAS | Washingto | USA |
| 26482 | Imaging & | 0.07 | 2 | 81352 | 8.44E+09 | Domestic | 5.04E+09 | Direct Dist | OCEANSID | California | USA | PORTLAN | Oregon | USA |
| 26483 | Imaging & | 0.63 | 17 | 81352 | 8.44E+09 | Domestic | 3.6E+09 | Direct Dist | OCEANSID | California | USA | VANCOUV | Washingto | USA |
| 26484 | Imaging & | 0.15 | 4 | 81352 | 8.44E+09 | Domestic | 3.61E+09 | Direct Dist | OCEANSID | California | USA | VANCOUV | Washingto | USA |
| 26485 | Imaging & | 0.07 | 2 | 81352 | 8.44E+09 | Domestic | 3.6E+09 | Direct Dist | OCEANSID | California | USA | VANCOUV | Washingto | USA |
| 26486 | Imaging & | 1.59 | 43 | 81352 | 8.44E+09 | Domestic | 3.61E+09 | Direct Dist | OCEANSID | California | USA | ORCHARD | Washingto | USA |
| 26487 | Imaging & | 2.44 | 66 | 81352 | 8.44E+09 | Domestic | 5.75E+09 | Direct Dist | VANCOUV | Washingto | USA | PLYMOUT | Indiana | USA |
| 26488 | Imaging & | 1.22 | 33 | 81352 | 8.44E+09 | Domestic | 7.63E+09 | Direct Dist | VANCOUV | Washingto | USA | OSSEO | Minnesota | USA |
| 26489 | Imaging & | 4.07 | 110 | 81352 | 8.44E+09 | Domestic | 7.63E+09 | Direct Dist | VANCOUV | Washingto | USA | OSSEO | Minnesota | USA |
| 26490 | Imaging & | 8.33 | 225 | 81352 | 8.44E+09 | Domestic | 7.63E+09 | Direct Dist | VANCOUV | Washingto | USA | OSSEO | Minnesota | USA |
| 26491 | Imaging & | 7.28 | 12 | 81352 | 8.44E+09 | Internation | 3.61E+09 | Direct Distance Dialing | | | Thailand | VANCOUV | Washingto | USA |
| 26492 | Imaging & | 1.21 | 2 | 81352 | 8.44E+09 | Internation | 3.61E+09 | Direct Distance Dialing | | | Thailand | VANCOUV | Washingto | USA |

Fig.3

VISUAL CONTENT QUERY FOR MULTI-DIMENSIONAL DATASETS

BACKGROUND

Various obstacles exist in order to analyze large volumes of multi-dimensional data. Queries on large multi-dimensional datasets typically are a relatively slow operation due to processes required on setup time, search time, and connection time. Further, most query specifications are limited to attributes and categories. As such, complex and multiple queries are required to query on a specific value in a transaction record. Further, traditional query results are written in pages or listings which can be difficult to interpret.

Prior data comparison techniques include simple graphical techniques, such as bar charts, pie charts, and x-y charts. These simple graphical techniques are easy to use but offer limited information when analyzing large amounts of business data. For example, simple bar charts or pie charts only show highly aggregated data. Drilldown techniques can be employed. Such techniques, however, merely allow users to drill down by attributes or categories.

In order to view specific content of a large multi-dimensional dataset, numerous and time-consuming queries are often necessary since query specifications are limited to attributes or categories of the dataset. Complex and multiple queries are required to query a specific value in a transaction record. Multiple queries often require manual evaluation of vast amounts of data. In some instances, the query results are written in multiple pages of search results or listings. Users are required to manually review the listings to find information on specific content or values in the data.

BRIEF DESCRIPTION OF THE DRAWINGS

FIG. 3 illustrates an exemplary multi-dimensional dataset showing calling card usage in accordance with an embodiment of the present invention.

DETAILED DESCRIPTION

Exemplary embodiments in accordance with the present invention are directed to systems, methods, and apparatus for content queries that generate visualizations of multi-dimensional datasets. Embodiments in accordance with the invention provide systems and methods for generating fast graphical interface content queries for visually mining large multi-dimensional datasets. Users are thus able to make a content query through a graphical interface on certain attribute values and to get real-time visual feedback while analyzing data. Visualizations are provided as interactive graphical displays.

Figure 1:
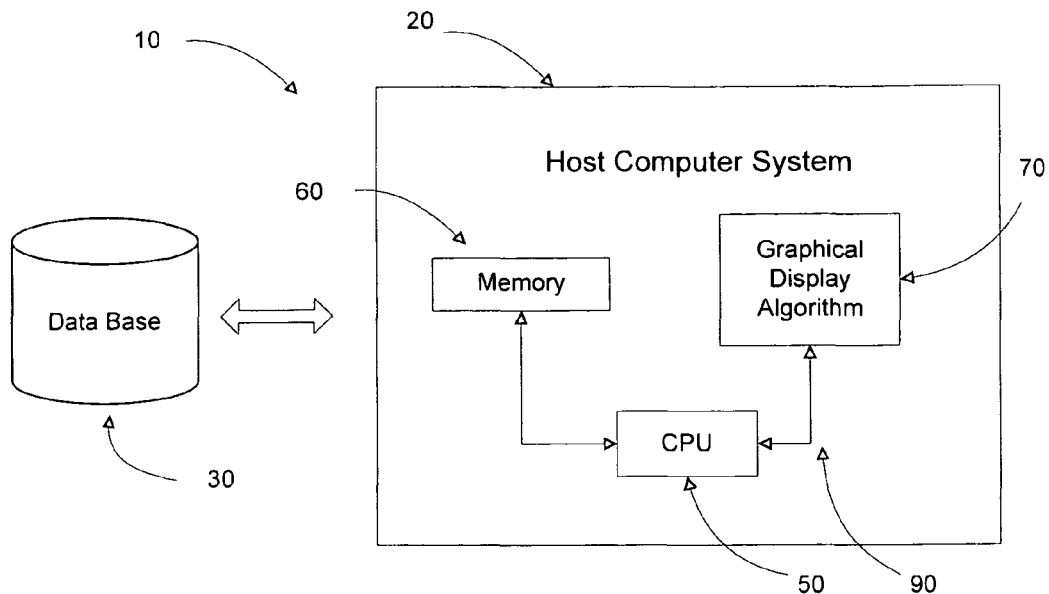
FIG. 1 illustrates an exemplary system in accordance with an embodiment of the present invention.

These embodiments are utilized with various systems and apparatus. FIG. 1 illustrates an exemplary embodiment as a system 10 for generating visualizations for content queries in multi-dimensional datasets.

The system 10 includes a host computer system 20 and a repository, warehouse, or database 30. The host computer system 20 comprises a processing unit 50 (such as one or more processors of central processing units, CPUs) for controlling the overall operation of memory 60 (such as random access memory (RAM) for temporary data storage and read only memory (ROM) for permanent data storage) and a graphical display algorithm or content query algorithm 70 for generating visualizations for content queries in multi-dimensional datasets. The memory 60, for example, stores data, control programs, and other data associate with the host computer system 20. In some embodiments, the memory 60 stores the graphical display algorithm 70. The processing unit 50 communicates with memory 60, data base 30, graphical display algorithm 70, and many other components via buses 90.

Embodiments in accordance with the present invention are not limited to any particular type or number of data bases and/or host computer systems. The host computer system, for example, includes various portable and non-portable computers and/or electronic devices. Exemplary host computer systems include, but are not limited to, computers (portable and non-portable), servers, main frame computers, distributed computing devices, laptops, and other electronic devices and systems whether such devices and systems are portable or non-portable.

Figure 2:
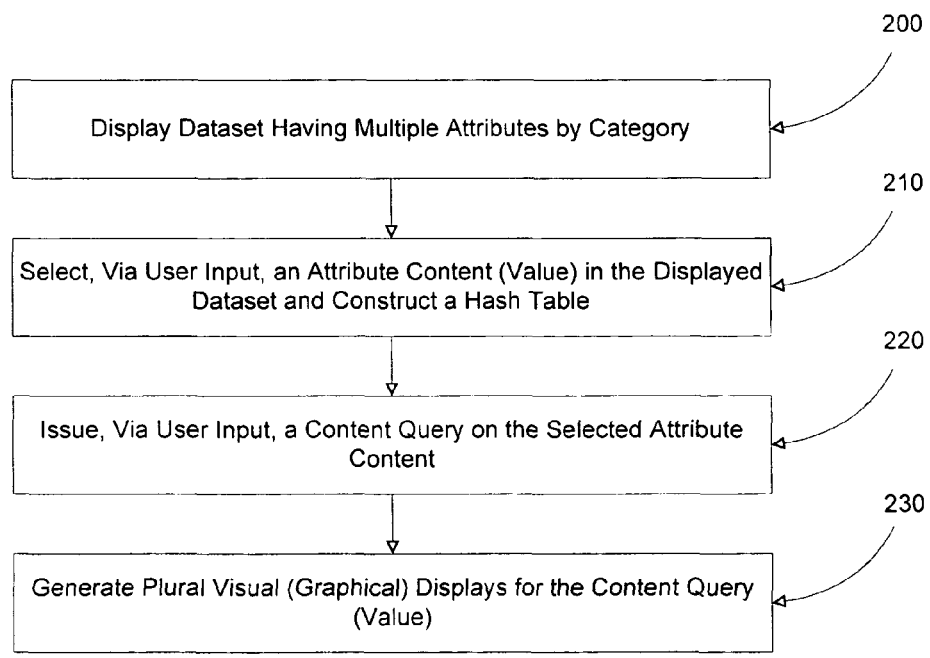
FIG. 2 illustrates an exemplary flow diagram in accordance with an embodiment of the present invention.

FIG. 2 illustrates an exemplary flow diagram for content queries that generate visualizations of multi-dimensional datasets. During visualization of a multi-dimensional dataset, users are able to make quick graphical queries on specified contents or values, beside attributes (such as categories) to understand the data. In other words, queries are not limited to data categories, but include specific content or values that comprise various categories. Embodiments in accordance with the invention use interactive graphical content queries and presentations to visualize data from different perspectives. In one exemplary embodiment, a user moves an on-screen pointer (example, through movement of a mouse or other input device) to a specific data item on a graph and issues a query on the dataset. The query, in turn, causes all the transaction records associated with this content to be graphically displayed to the user for further visual analysis and uses a graphical interface (example, pull-down menus).

In order to generate fast visual content queries for visually mining large multi-dimensional datasets, exemplary embodiments in accordance with the invention utilize one or more of the following: (1) select a value from a transaction record and generate a content query to visually select an attribute content (value) from a transaction record (dataset); (2) use an association algorithm to associate all transaction records that include the attribute values matching the query contents; (3) store the query results in an associated hash map for quick retrieval; (4) partition and layout the associated hash map to a sequence of graphical displays. The use of real-time content queries, in-core association, and hash map partitioning and rendering shorten the entire processing time to generate interactive graphical results to queries. Users receive near instant feedback to queries, including graphically based queries. Further, the graphical displays themselves are interactive with the user such that queries are generated on or at the graphical display (example, at the location of a specific content or value). FIGS. 2-8 further illustrate the construction and operation of exemplary embodiments of generating content queries for visual analysis of multi-dimensional datasets.

FIG. 2 provides an exemplary flow diagram in accordance with an embodiment of the present invention. For illustration purposes, FIG. 2 is discussed in conjunction with specific examples illustrated in FIGS. 3-8. The examples provided in FIGS. 3-8 are provided as illustrations for discussion and are not provided to limit embodiments in accordance with the invention.

FIG. 3 illustrates an exemplary multi-dimensional dataset 300 showing calling card usage for employees in various business groups (categories) of a company. To analyze calling card usage, it is necessary to record and analyze the detail information about the data appearing in categories, such as Business Group, Cost, Duration, and Employee, etc. The number of dimensions and size of the data grows with the business. Therefore, the data is very large and has multiple dimensions (i.e., categories).

In order to assess the data, users or analysts can have various questions, such as "Who is the top caller? How many calls did this particular caller make? To and from which countries did the caller call?" These and other queries are answered in real-time using, for example, one or more of the following visual query steps: (1) moving a pointer or input device to particular cell, pixel, or graph location; (2) displaying the content of a transaction record at a selected location; and (3) selecting one or more graphical contents in a record. Then, a sequence of graphical displays (example, bar charts, pixel bar charts, graphs, maps, etc.) is presented to the analyst to answer the above questions.

Figure 4:
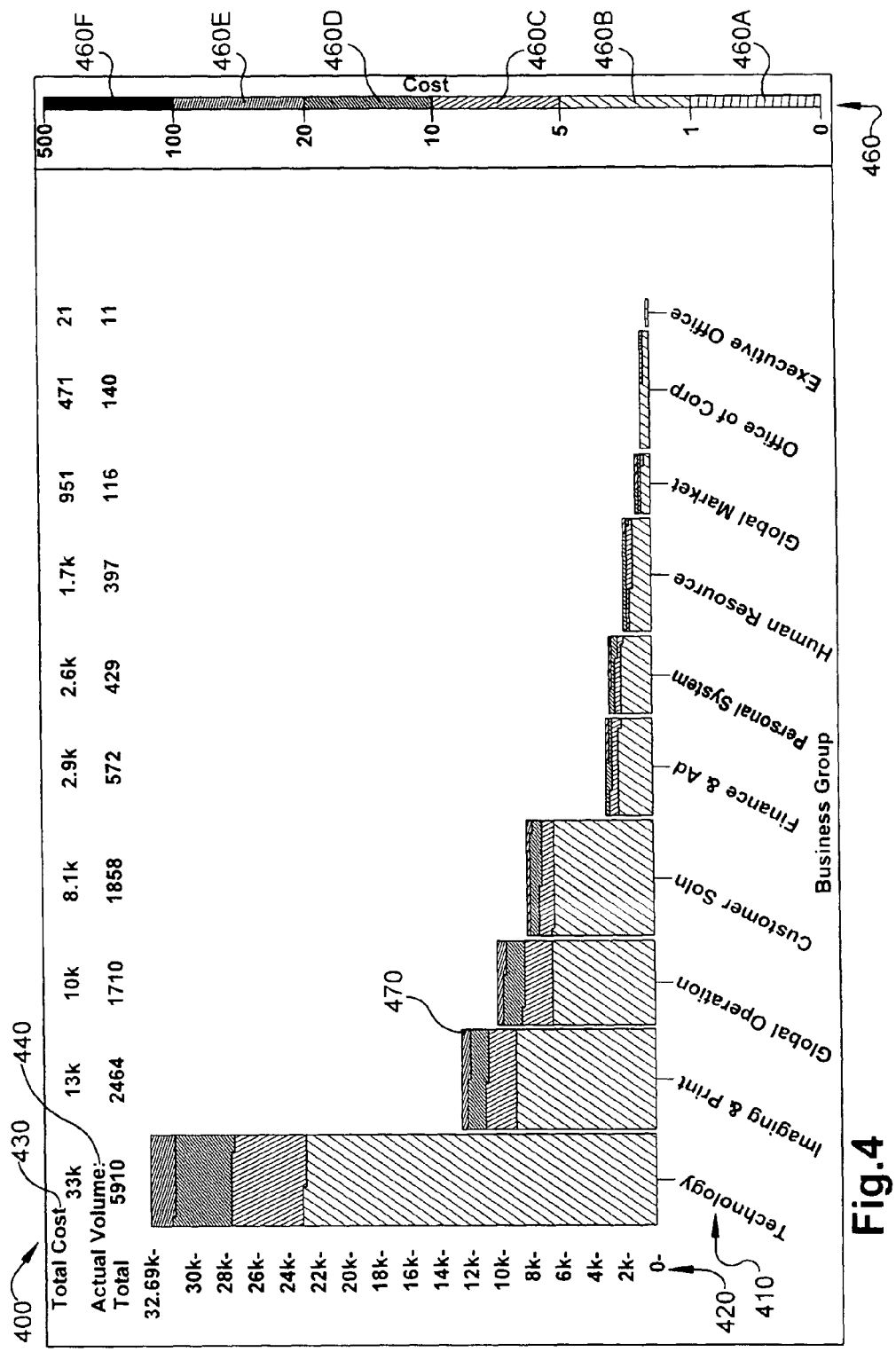
FIG. 4 illustrates an exemplary pixel bar chart filed with pixels and showing calling card usage in accordance with an embodiment of the present invention.

Looking to FIG. 2, according to block 200, a visualization or display is provided having multiple attributes by category. In one embodiment, the display is a multi-dimensional graph or dataset. Multi-dimensional graphs have plural data categories or dimensions. FIGS. 3 and 4 illustrate examples of multi-dimensional graphs. As shown in FIG. 3, for example, dataset 300 has a plurality of columns 310 and rows 320 that form a spreadsheet with numerous individual cells. Each column represents a different attribute, such as A (Business), B (Cost), C (Duration), D (Employee), etc. Values or content for the categories are provided at the intersection of columns and rows. The values can be a single cell (such as cell 330) or a group of cells (such as cell group 340).

According to block 210, a user (example, data analyst) selects one or more attribute contents (i.e., values) in the displayed dataset and a hash table is constructed. Selection is made with various inputs, such as a mouse, a pointer, cursor/arrow selection, etc. The selection is made at a value location to get the transaction record on which the user requests more information. For instance, a user moves the pointer to a data item to perform a content query, display a transaction record, select any attribute. By way of example, content queries are made on specific content or values and range from small values (such as single cells, items, people, names, addresses, countries, etc.) to large values (such as multiple cells, plural items, etc.). This selection process is illustrated in connection with FIGS. 4 and 5.

FIG. 4 illustrates an exemplary pixel bar chart 400 showing calling card usage for employees of FIG. 3. In FIG. 4, the pixel bar chart is filled or complete with pixels that represent a transactional record data item. Specific data values and names (such as names of business groups) are provided merely for illustration and not to limit embodiments in accordance with the invention. By way of illustration, the X-axis 410 represents plural business groups, such as a first business group (example, Technology), a second business group (example, Imaging & Printing), a third business group (example, Global Operations), etc. The Y-axis 420 represents a total number of telephone calls made during a particular period. A top portion of the pixel bar chart includes two rows: Total Cost 430 (representing the total dollar amount spent on telephone calls for each business group) and Actual Volume 440 (representing the total number of telephone calls made for each business group). By way of example, FIG. 4 shows that the Image & Print business group made 2,464 telephone calls at a cost of about $13,000.

Pixels in the graphical illustration represent a data item that enables the visualization of large volumes of data. The color of a pixel represents the value of a data item shown at an adjacent color map. A consistent or common scale 460 (such as a color scale) is used through the various graphs. The color scale 460 represents the scale for data across various layers or graphs. A color scale can be generated with a variety of symbols, letter, markings, colors, indicia, etc. Further, the scale is divided into a continuous plurality of ranges wherein each range has a different visual identification or marking, such as a different color. As shown, range 460A includes values of $0-$1; range 460B includes values of above $1-$5; range 460C includes values of above $5-$10; range 460D includes values of above $10-$20; range 460E includes values of above $20-$100; and range 460F includes values above $100-$500. Further, each color scale is a continuous color map for each data item. For example, $0-$1 contains data items for dollar values $0.01, 0.02, 0.03 etc. (with each dollar amount within the range having its own shading of color).

In one embodiment, the graphs are constructed and presented in a pixel-oriented layout to enable quick access or instant-drilldown to content or value queries. A pixel, for example, can represent a data record. Further, the color of a pixel can represent the value of a data item. In some exemplary embodiments, the graphs are pixel bar charts. The pixel are arranged from left to right and bottom to top based on the value data items in a bar. In the graphs, the X-axis represents a business group; the Y-axis represents a number of transactions; and color represents a dollar amount for a transaction (telephone call). Of course, representations in the X and Y axes could be switched or altered and still be within the scope of embodiments in accordance with the invention.

Each pixel can be arranged in a variety of ways. For example, pixels are arranged from bottom to top and left to right in each bar. Further, information (such as the employee who placed the telephone call) are encoded in each pixel and represented, for example, as a color or other graphical representation. As one example, each separate transaction (example, telephone call) in each layer or graph is represented with a pixel. The amount of time for each transaction is encoded into the pixel. Further, the color of the pixel correlates to the color scale 460. Thus, business groups with higher bars in the graph have more pixels (i.e., more transactions or telephone calls). Likewise, more red or darker pixels in the bar indicate more expensive telephone calls. A user can also "click" or otherwise activate any individual pixel and get specific information or data regarding the individual transaction.

Looking to FIG. 4, users can request more information on specific content or values in the categories of the datasets or graphs. By way of example, business group Image & Print shows a transaction or data record 470 having a high cost. This data record represents a suspicious location about which a user may require more information. In other words, a user can request or initiate a visual content query on this value.

Figure 5:
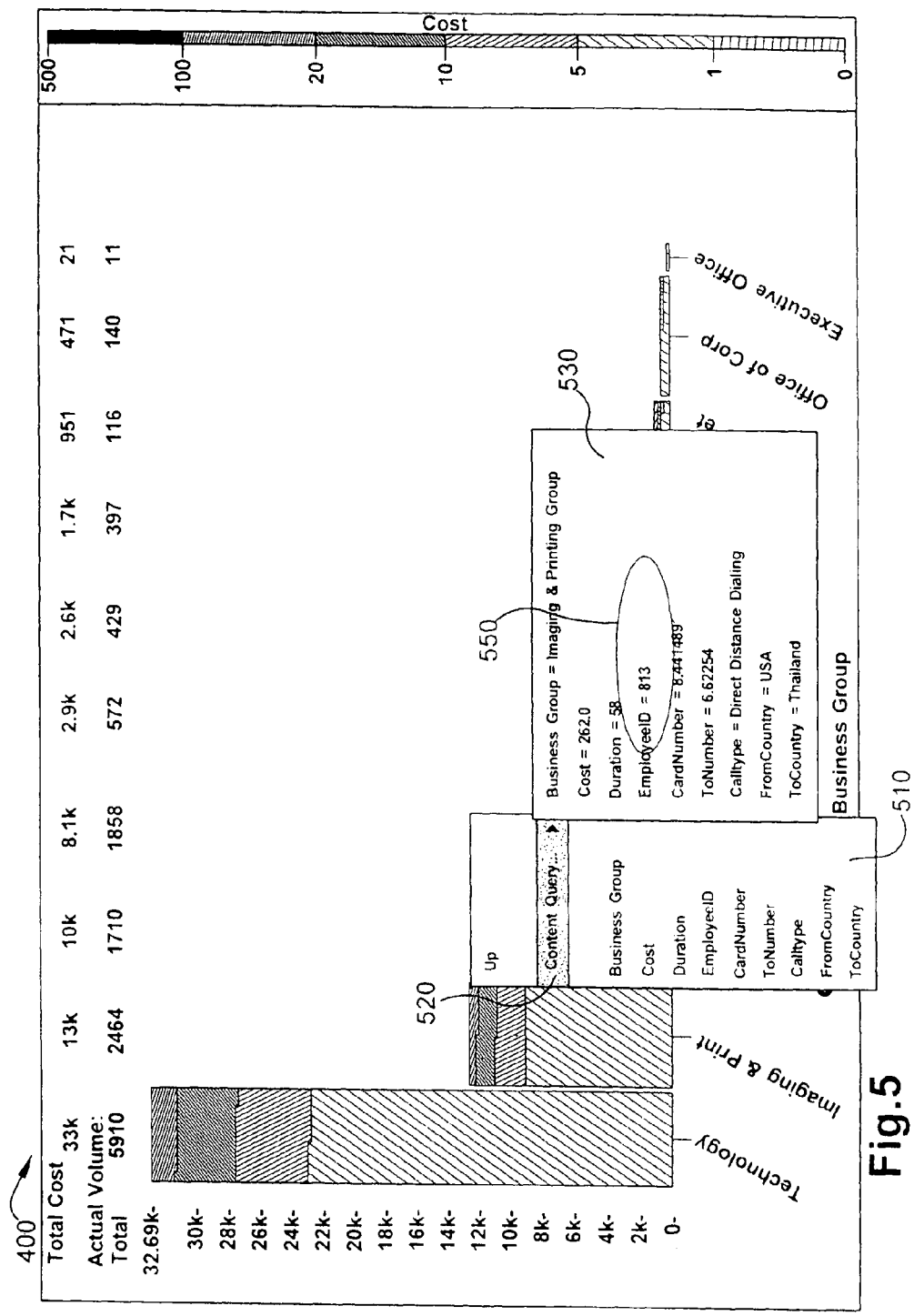
FIG. 5 illustrates an exemplary content query on a graph for specific content of the calling card usage dataset in accordance with an embodiment of the present invention.

As used herein, a "visual content query" is request for information stored in a database, wherein the request is on content that is being visually displayed or presented. FIGS. 4 and 5 illustrate an exemplary visual content query being performed on an attribute content (example, a value) that is being displayed in a graph.

FIGS. 4 and 5 illustrate a content query for the specific content of data record 470 of the calling card usage dataset. In one exemplary embodiment, a user moves a cursor or pointer to the data record 470 and "clicks" or otherwise activates a query for the data record. Upon activation of the data record 470, a pull-down menu 510 appears on the graph 400. The pull-down menu includes a plurality of categories (such as Business Group, Cost, Duration, etc.). These categories are obtained from the dataset 300 of FIG. 3.

Content query 520 is one option or menu selection in pull-down menu 510. Selection of content query 520 generates a second pull-down menu 530 on the graph 400. The pull-down menu 530 provides a plurality of different subjects or topics for a content query on data record 470. For example, a user can select one or more of different values associated with Business Group, Cost, Duration, etc. For discussion purposes, a selection is made for a particular employee 550 ("EmployeeID=81352"). Selection of this specific content value indicates that the user requests a content query for a selected content of a category in the dataset. Issuance of this selection is represented at block 220 in FIG. 2.

In one exemplary embodiment, an association algorithm is used to associate all transaction records having attribute values that match the specified content query. The association algorithm associates all data to the specific content query. In the example of FIG. 5, the content query is directed to all telephone calls made by a particular employee (i.e., employee having identification number 81352). All telephone calling information or telephone data relating to this particular employee is collected and stored. In one exemplary embodiment, the content query results are stored in a hash map or hash table.

The hash is generally smaller than the data itself and is generated by a formula. A hash function H, for example, is a transformation that takes an input "m" and returns a fixed-size string, called a hash value "h" (such that h=H(m)). Hashed data is computationally quicker to process than un-hashed data. Further, hashes provide efficient data structures for lookup and comparison (example, display in pixel bar charts).

Figure 6:
FIG. 6 illustrates an exemplary first graph generated from the content query of FIG. 5 in accordance with an embodiment of the present invention.
Figure 7:
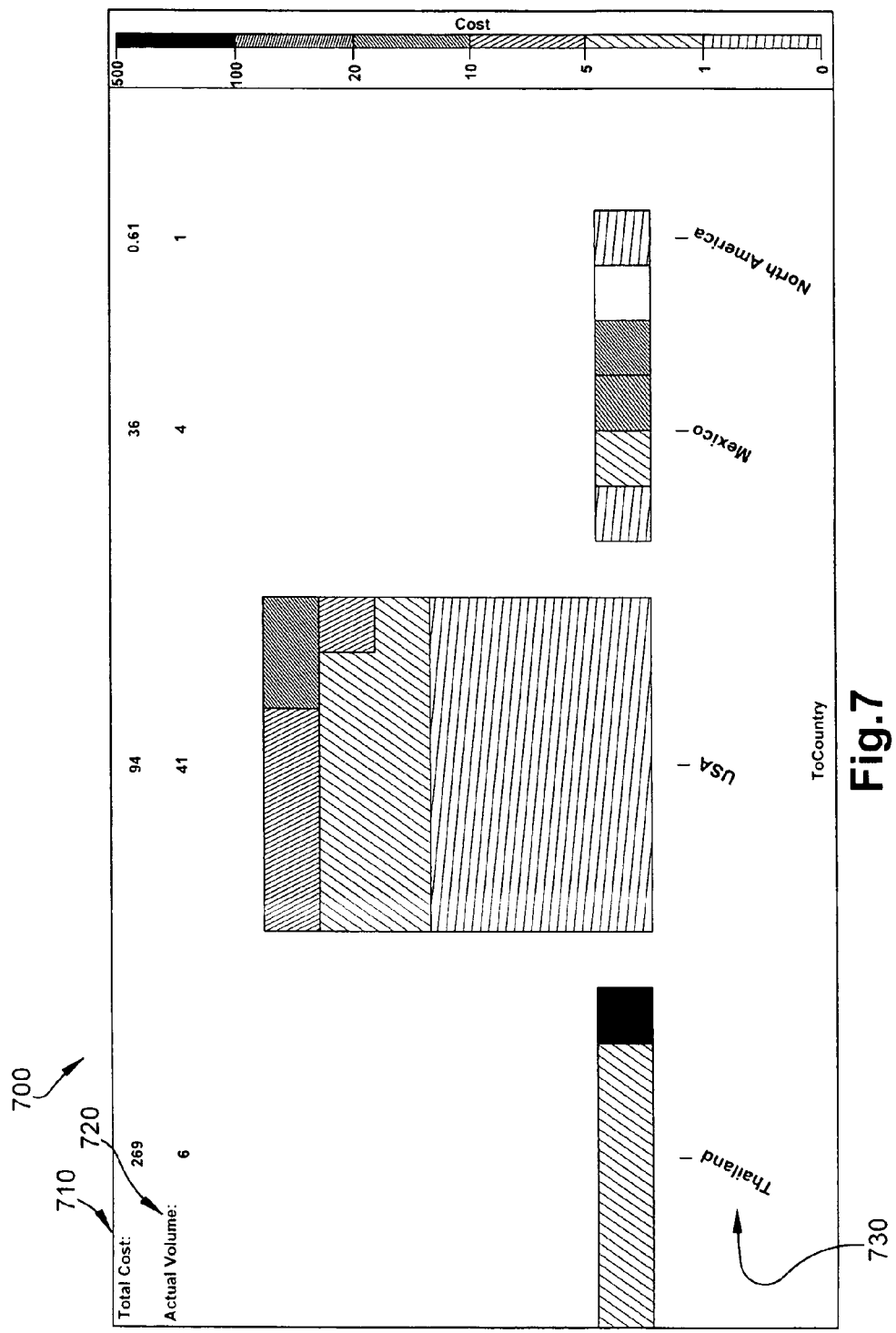
FIG. 7 illustrates an exemplary second graph generated from the content query of FIG. 5 in accordance with an embodiment of the present invention.
Figure 8:
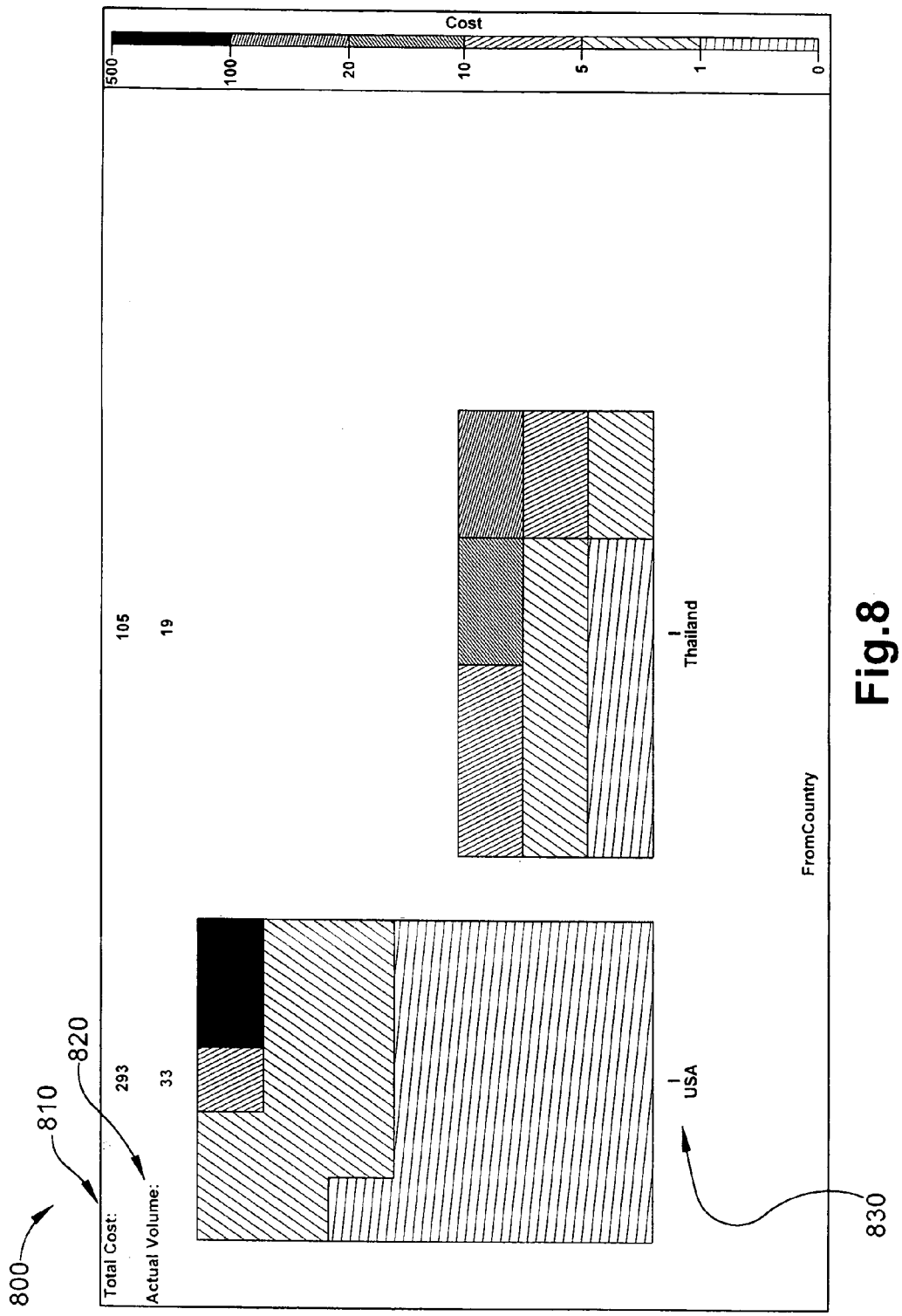
FIG. 8 illustrates an exemplary third graph generated from the content query of FIG. 5 in accordance with an embodiment of the present invention.

Once the data is hashed, the associated hash map is partitioned and rendered to a sequence or plurality of visualizations, such as graphical displays (see block 230 of FIG. 2). These visualizations are used to analyze all associated transaction records for the content query. In the example of FIG. 5, plural graphs are presented so the transaction records corresponding to the selected employee (i.e., employee having identification number 81352) can be analyzed. FIGS. 6-8 illustrate three exemplary graphs for the specified content query for the selected employee.

FIG. 6 illustrates a graph 600 that shows call information for the top call user or employee for the business category of Image & Print. The figure illustrates the number of telephone calls, price of each call, and costs associated with the calls. As shown, this employee (i.e., employee having identification number 81352) made 52 total calls (Actual Volume 610) that cost $399 (Total Cost 620). As shown, most calls were in one of two price ranges, either less than $1 or between $1 and $5, as shown in the two large areas in the figure.

FIG. 7 illustrates a graph 700 that shows further call information for the top call user or employee for the business category of Image & Print. The figure illustrates the number and cost of telephone calls made from each different geographical location. The total cost 710 and actual volume 720 are shown for various countries 730 (such as Thailand, USA, Mexico, and North America). As shown, this employee (i.e., employee having identification number 81352) made the most calls from the United States, but the largest total expense for calls occurred in Thailand which has six calls (one call being the highest price).

FIG. 8 illustrates a graph 800 that shows further call information for the top call user or employee for the business category of Image & Print. The figure illustrates the origin or geographical location for the origination of the telephone calls. The total cost' 810 and actual volume 820 are shown for various countries 830 (such as Thailand and USA). As shown, this employee (i.e., employee having identification number 81352) made the most calls from the United States.

In one exemplary embodiment, once the data is hashed, the associated hash map is partitioned and rendered to generate various outputs. Examples of static outputs include, but are not limited to, spreadsheets, pivot tables, JPEG (Joint Photographic Experts Group) files, and other print-outs or formats for over-night reporting. The non-static outputs include, but are not limited to, interactive outputs, such as interactive graphs (pixel bar charts, bar charts, spreadsheets, and other "clickable" formats).

FIGS. 6-8 represent graphical results for the query. FIG. 5 shows the graphical input of the user to the content query. Further, the pixel bar charts shown in FIGS. 4-8 represent examples of interactive graphical displays or outputs. As used herein, the term "interactive" means accepting input (example, on a graph or table) from a human such that users can enter data or commands (i.e., instructions to a computer or device to perform a specific task). The interactive displays are responsive to the user entering data or commands. As shown in FIG. 5, for example, when a user clicks or activates a pixel (i.e., a content value) in a category of the display, a pull-down menu automatically appears on the display. The pull-down menu is further interactive with the user to generate and commence a query to the selected content value. By way of example, interactive graphs and displays are "clickable" (example, responsive to tapping on a mouse, key pad, display, or the like). By contrast, the term "static" refers to elements that are fixed and not capable of accepting input from a human user.

Interactive graphs and displays also support drilldown on pixels to get detail records. The term "drilldown" or "drill down" (or variations thereof) is used when referring to moving down through a hierarchy of folders and/or files in a file system like that of Windows. The term may also mean clicking, selecting, and/or navigating through a series of dropdown menus or graphical illustrations in a graphical user interface. Drilldown layers, for example, allow the user to explore the graphical illustration in a hierarchical manner by pointing, clicking, and/or selecting on the part of the graphical illustration where more detail is needed but illustrate an exemplary embodiment for discussion.

Embodiments in accordance with the invention automatically export the content query results to an interactive graphic or display and/or a static graphic or display. Further, exemplary embodiments enable users to issue and receive real-time content queries on a specified value and quickly visualize the results in a sequence of displays. Queries are not limited to attributes, dimensions, or categories but include specific values in a transactional record (such as a specific data value displayed in a dataset). The query results are then graphically displayed to the user.

In one exemplary embodiment, the flow diagrams are automated. In other words, apparatus, systems, and methods occur automatically. As used herein, the terms "automated"

or "automatically" (and like variations thereof) mean controlled operation of an apparatus, system, and/or process using computers and/or mechanical/electrical devices without the necessity of human intervention, observation, effort and/or decision.

The flow diagrams in accordance with exemplary embodiments of the present invention are provided as examples and should not be construed to limit other embodiments within the scope of the invention. For instance, the blocks should not be construed as steps that must proceed in a particular order. Additional blocks/steps may be added, some blocks/steps removed, or the order of the blocks/steps altered and still be within the scope of the invention. Further, specific numerical data values (such as specific quantities, numbers, categories, etc.) or other specific information should be interpreted as illustrative for discussing exemplary embodiments. Such specific information is not provided to limit the invention. Further, although bars are used in the graphs, other graphical illustrations can also be used.

In an exemplary embodiment, the present invention is directed to visual data comparison techniques for quickly and easily comparing, analyzing, and/or revealing information in large amounts of data. Embodiments in accordance with the invention, for example, are utilized to visualize valuable information concealed in vast amounts of data, such as business data.

FIGS. 3-8 illustrate exemplary embodiments for visualization of content queries for multi-dimensional datasets. Various different types of graphs or other different visualization techniques or visual data comparison techniques can be utilized and still be within the scope of the invention. Further, embodiments within the invention are applicable to various types of data and are not limited to, for example, business data.

Further, it should be noted that the display of graphical results is not limited to single illustrations. In other words, multiple illustrations can simultaneously be displayed to the user. For example, the graphical illustrations of FIGS. 6-8 can simultaneously be displayed to the user on a single display or on multiple displays.

In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software (whether on the host computer system of FIG. 1, a client computer, or elsewhere) will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory, and accessed by the processor using the bus. The techniques and methods for embodying software programming code in memory, on physical media, and/or distributing software code via networks are well known and will not be further discussed herein. Further, various calculations or determinations (such as those discussed in connection with the figures are displayed, for example, on a display) for viewing by a user.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
performing, by a computer:
causing display, on an interactive visualization, plural categories and values for the plural categories of a multi-dimensional dataset, the interactive visualization comprising pixels representing respective data records containing the values for the plural categories;
receiving an indication of user selection of a pixel of the pixels displayed on the interactive visualization, the selected pixel representing a given data record of the data records;
issuing, in response to the user selection, a visual content query including at least one value in the given data record for at least one of the plural categories;
retrieving data records from the multi-dimensional dataset that match the at least one value in the visual content query;
applying a hashing function on the retrieved data records to generate hashed data, and storing data of the retrieved data records according to the hashed data in a hash map; and
generating plural interactive graphs based on partitioning the hash map into plural hash map partitions, the plural interactive graphs corresponding to the respective plural hash map partitions and presenting different visualizations of data in the retrieved data records.

2. The method of claim 1, wherein receiving the indication of the user selection is responsive to a user action made with an input device with respect to the selected pixel.

3. The method of claim 1, further comprising causing display of the plural interactive graphs in real-time in response to the issuing of the visual content query.

4. The method of claim 1, further comprising causing display of the interactive visualization that comprises an interactive pixel bar chart comprising a plurality of bars, each bar of the plurality of bars including a respective subset of the pixels.

5. The method of claim 1, further comprising:
in response to the indication of the user selection of the pixel, causing display of a control menu in the interactive visualization, the control menu displaying categories of the plural categories and corresponding values of the displayed categories; and
generating the visual content query in response to user selection of one of the displayed categories and the corresponding value, the at least one value included in the visual content query being the corresponding value of the selected displayed category.

6. The method of claim 5, wherein the corresponding values of the displayed categories in the control menu are values in the given data record.

7. The method of claim 5, wherein the control menu is a drop-down menu.

8. The method of claim 1, further comprising assigning different colors to the respective pixels based on values in the data records of a given category of the plural categories.

9. A non-transitory computer readable storage medium storing instructions for causing a computer to:
- cause display, on an interactive visualization, plural categories and values for the plural categories of a multi-dimensional dataset, the interactive visualization comprising pixels representing respective data records containing the values for the plural categories;
- receive an indication of user selection of a pixel of the pixels displayed on the interactive visualization, the selected pixel representing a given data record of the data records;
- issue, in response to the user selection, a visual content query including at least one value in the given data record for at least one of the plural categories;
- retrieve data records from the multi-dimensional dataset that match the at least one value in the visual content query;
- apply a hashing function on the retrieved data records to generate hashed data, and store data of the retrieved data records according to the hashed data in a hash map; and
- generate plural interactive graphs based on partitioning the hash map into plural hash map partitions, the plural interactive graphs corresponding to the respective plural hash map partitions and presenting different visualizations of data in the retrieved data records.

10. The non-transitory computer-readable storage medium of claim 9, wherein the instructions are for causing the computer to use an association algorithm to associate data records having attribute values that match the at least one value in the visual content query.

11. The non-transitory computer-readable storage medium of claim 9, wherein the instructions are for causing the computer to further assign different colors to the respective pixels based on values in the data records of a given category of the plural categories.

12. The non-transitory computer-readable storage medium of claim 9, wherein the at least one value in the visual content query is a specific data value contained in the given data record for one of the plural categories.

13. The non-transitory computer readable storage medium of claim 9, wherein the instructions are for causing the computer to further:
- in response to the indication of the user selection of the pixel, cause display of a drop-down menu in the interactive visualization, the drop-down menu displaying categories of the plural categories and corresponding values of the displayed categories; and
- generate the visual content query in response to user selection of one of the displayed categories and the corresponding value, the at least one value included in the visual content query being the corresponding value of the selected displayed category.

14. The non-transitory computer readable storage medium of claim 13, wherein the corresponding values of the displayed categories in the drop-down menu are values in the given data record.

15. A computer system comprising:
- a memory to store instructions; and
- at least one processor, the instructions executable on the at least one processor to:
  - cause display of an interactive visualization depicting plural categories and values for the plural categories of a dataset, the interactive visualization comprising pixels representing respective data records containing the values for the plural categories;
  - receive an input device selection of a pixel of the pixels on the interactive visualization, the selected pixel representing a given data record of the data records;
  - in response to the selection of the pixel, generate a content query that includes at least one value in the given data record for at least one of the plural categories;
  - retrieve data records from the dataset that match the at least one value in the visual content query;
  - apply a hashing function on the retrieved data records to generate hashed data, and store data of the retrieved data records according to the hashed data in a hash map; and
  - generate plural interactive graphs based on partitioning the hash map into plural hash map partitions, the plural interactive graphs corresponding to the respective plural hash map partitions and presenting different visualizations of data in the retrieved data records.

16. The computer system of claim 15, wherein the interactive visualization is a pixel bar chart comprising a plurality of bars, each bar of the plurality of bars including a respective subset of the pixels.

17. The computer system of claim 15, wherein the instructions are executable on the at least one processor to automatically generate the plural interactive graphs in real-time in response to the input device selection of the pixel.

18. The computer system of claim 15, wherein the instructions are executable on the at least one processor to further:
- in response to the input device selection of the pixel, cause display of a control menu in the interactive visualization, the control menu displaying categories of the plural categories and corresponding values of the displayed categories; and
- generate the content query in response to user selection of one of the displayed categories and the corresponding value, the at least one value included in the content query being the corresponding value of the selected displayed category.

19. The computer system of claim 18, wherein the corresponding values of the displayed categories in the control menu are values in the given data record.

* * * * *